United States Patent
Kuisma

(10) Patent No.: US 6,259,929 B1
(45) Date of Patent: Jul. 10, 2001

(54) RADIO PHONE COMPOSABLE OF SEPARATE MODULES

(75) Inventor: Erkki Kuisma, Halikko (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/251,014

(22) Filed: May 31, 1994

Related U.S. Application Data

(63) Continuation-in-part of application No. 07/887,079, filed on May 22, 1992, now abandoned.

(30) Foreign Application Priority Data

May 30, 1991 (FI) ........................................ 912650

(51) Int. Cl.⁷ .............................. H04B 1/38; H04M 1/00
(52) U.S. Cl. ....................................................... 455/550
(58) Field of Search ...................... 379/58, 63; 455/33.1, 455/90, 89

(56) References Cited

U.S. PATENT DOCUMENTS

| | | | |
|---|---|---|---|
| 4,134,070 | * | 1/1979 | Henderson et al. . |
| 4,881,258 | * | 11/1989 | Kaiwa et al. ............................ 379/58 |
| 5,014,294 | * | 5/1991 | Kromenaker et al. .................. 379/58 |
| 5,020,093 | * | 5/1991 | Pireh ..................................... 379/59 |
| 5,040,204 | * | 8/1991 | Sasaki et al. ........................... 379/61 |
| 5,119,397 | * | 6/1992 | Dahlin et al. ............................. 375/5 |
| 5,128,981 | * | 7/1992 | Tsukamoto et al. ..................... 379/58 |
| 5,170,494 | * | 12/1992 | Levanto et al. ......................... 455/90 |
| 5,228,074 | * | 7/1993 | Mizikovsky .............................. 379/59 |
| 5,239,690 | * | 8/1993 | Heinonen ................................ 455/89 |
| 5,249,302 | * | 9/1993 | Metroka et al. ..................... 455/11.1 |
| 5,251,329 | * | 10/1993 | Takagi et al. ........................... 455/89 |
| 5,259,018 | * | 11/1993 | Grimmett et al. ...................... 379/58 |
| 5,265,158 | * | 11/1993 | Tattari ................................... 379/433 |
| 5,283,811 | * | 2/1994 | Chennakeshu et al. ................ 375/14 |

FOREIGN PATENT DOCUMENTS

| | | |
|---|---|---|
| 81932 | 8/1990 | (FI) . |
| 3224422 | * 9/1988 | (JP) . |

\* cited by examiner

*Primary Examiner*—William Cumming
(74) *Attorney, Agent, or Firm*—Perman & Green, LLP

(57) ABSTRACT

The present invention relates to a radio phone composed of separate modules, comprising a basic module (1) and at least one additional module (2 or 3) detachably plugged thereto. The basic module (1) comprises at least the components and functions which are common to phones operating both in analogue and digital mode. The additional module (2 or 3) includes the main part of the electrical circuits required in transmitting and receiving an analogue or a digital signal. The phone operates as a single-mode phone when one of the additional modules (2 or 3) is plugged into the basic module (1), and as a dual-mode phone when both the first additional module (2) and the second additional module (3) have been plugged into the basic module (1).

17 Claims, 4 Drawing Sheets

RADIO PHONE COMPOSABLE OF SEPARATE MODULES

This is a continuation-in-part of application Ser. No. 07/887,079 filed on May 22, 1992 abandoned.

The present invention relates to a radio phone composable of separate modules, comprising a basic module and at least one additional module detachably plugged thereto.

BACKGROUND OF THE INVENTION

The subscriber numbers of mobile phone networks increase strongly every year; consequently, the capacity of analogue mobile phones is coming to an end in several countries in the course of the next few years. In addition, the analogue networks are frequently national. In order to solve the problems related to capacity and internationality, a general European GSM mobile phone network is being implemented. The GSM network is the first fully digital mobile phone network. Digital mobile phone networks are being established also in the US.

Installing new digital networks takes several years. Starting of a GSM network will begin in capitals and will gradually spread to form a network which covers the whole Europe. In the transition period, an existing analogue mobile phone network operating in the same frequency range can be used in parallel with the new digital network. Analogue networks operating in Europe in the same frequency range include NMT-900 in the Nordic countries and TACS in Britain. In the USA, the analogue AMPS network operates in the same frequency range, and the coming digital CDMA network as well as the dual-mode network.

In the analogue network the mobile phone receives and transmits an analogue signal; respectively, in the digital network, a digital signal. Thus, mobile phones provided for an analogue network cannot as such be used in digital networks of the same frequency range, and vice versa. Transition into new digital networks is almost indispensable since the analogue networks are overloaded. On the other hand, the new network is not very large at the very beginning, so that a parallel use together with the existing analogue networks would be desirable.

The problem of two networks can be solved in that a so-called dual-mode phone is specified which is able to operate both as a digital and an analogue phone. The dual-mode phone selects automatically either of the modes of operation to conform to the base station environment. For instance, in the future US dual-mode system this kind of phone is a necessity because also in digital mode, the paging channel trafficing is carried out in the channels of the AMPS system. In the digital systems as such, the dual-mode phone facilitates the transition period.

The dual-mode phone is larger in size and in weight than the single-mode phone so that it is unnecessarily bulky to carry when the user is located clearly in the range of operation of either the analogue network or the digital network. In the city centres where the analogue network is crowded, it is convenient to use the digital network, and in suburban areas where digital networks have not been initially installed, the analogue network has to be used.

SUMMARY OF THE INVENTION

The object of the invention is to provide an apparatus to be operable both in the form of single-mode and dual-mode phone. The phone would be operable in the current wide analogue network range in the form of a small-sized analogue phone, and in a crowded city area in the form of a small digital phone. It is expedient to use the phone as a dual-mode phone in areas in which the analogue and the digital networks overlap and when moving somewhat across a borderline of one of the networks into an area of another network because the phone automatically picks the mode of operation according to the services available. For instance, when moving beyond the coverage area of the digital network to an area where an analogue network already exists, the phone automatically shifts to the analogue mode of operation.

According to the present invention there is provided a radio telephone capable of dual-mode operation, comprising a basic module including circuitry common to the operation of the telephone in both modes, a first supplementary module including circuitry for processing signals characteristic of a first mode of operation, and a second supplementary module including circuitry for processing signals characteristic of a second mode of operation, wherein at least one of the first and second supplementary modules may be detachable coupled to the basic module such that the telephone is operable in the first and/or second modes according to which of the first and second supplementary modules is coupled to the basic module.

A telephone in accordance with the invention is thus operable in a first mode when the first supplementary module is in place, and in a second mode when the second subsidiary module is in place. A dual-mode of operation is possible if both the supplementary modules are present.

The first mode may correspond to an analogue mode or operation and the second mode to a digital mode of operation. Alternatively, the two modes of operation may relate respectively to different digital systems, e.g. a time division multiple access (TDMA) system and a code division multiple access system (CDMA).

In the dual digital mode embodiment the first supplementary module includes circuitry for processing digital signals associated with a first radio telephone system, and the second supplementary module includes circuitry for processing digital signals associated with a second radio telephone system.

In the analogue-digital dual-mode embodiment the first supplementary module includes circuitry for processing analogue signals associated with an analogue radio telephone system, and the second supplementary module includes circuitry for processing digital signals associated with a digital radio telephone system.

One of the supplementary modules may be provided integrally with said basic module. In this case the dual-mode of operation is enabled by attaching the other supplementary module to the basic module.

Alternatively, both said first and second supplementary modules respectively may be detachably coupled to the basic module. In this case either mode of operation may be enabled by attachment of the corresponding supplementary module. Suitably, one of the supplementary modules may be detachably coupled to the other supplementary module so that when both supplementary modules are attached, dual-mode operation is enabled.

Thus it can be seen that a telephone in accordance with the present invention offers maximum flexibility in view of the different telephone systems available, wherein the user can render the telephone operable on a particular system by attaching the appropriate supplementary unit to the basic module of the telephone.

BRIEF DESCRIPTION OF THE DRAWINGS

The invention is described more in detail in FIGS. 1, 2 and 3 which according to the invention present schematically various embodiments of the mobile phone composed of separate modules.

DETAILED DESCRIPTION OF THE PREFERRED EMBODIMENTS

Figure 1:
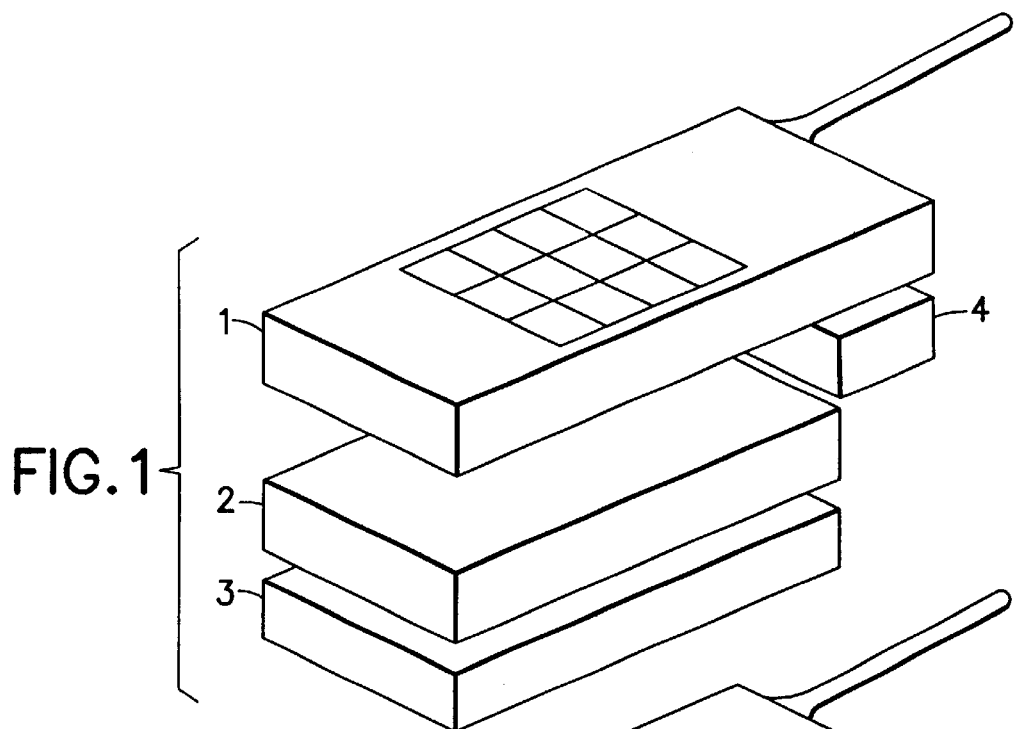
Figure 6:
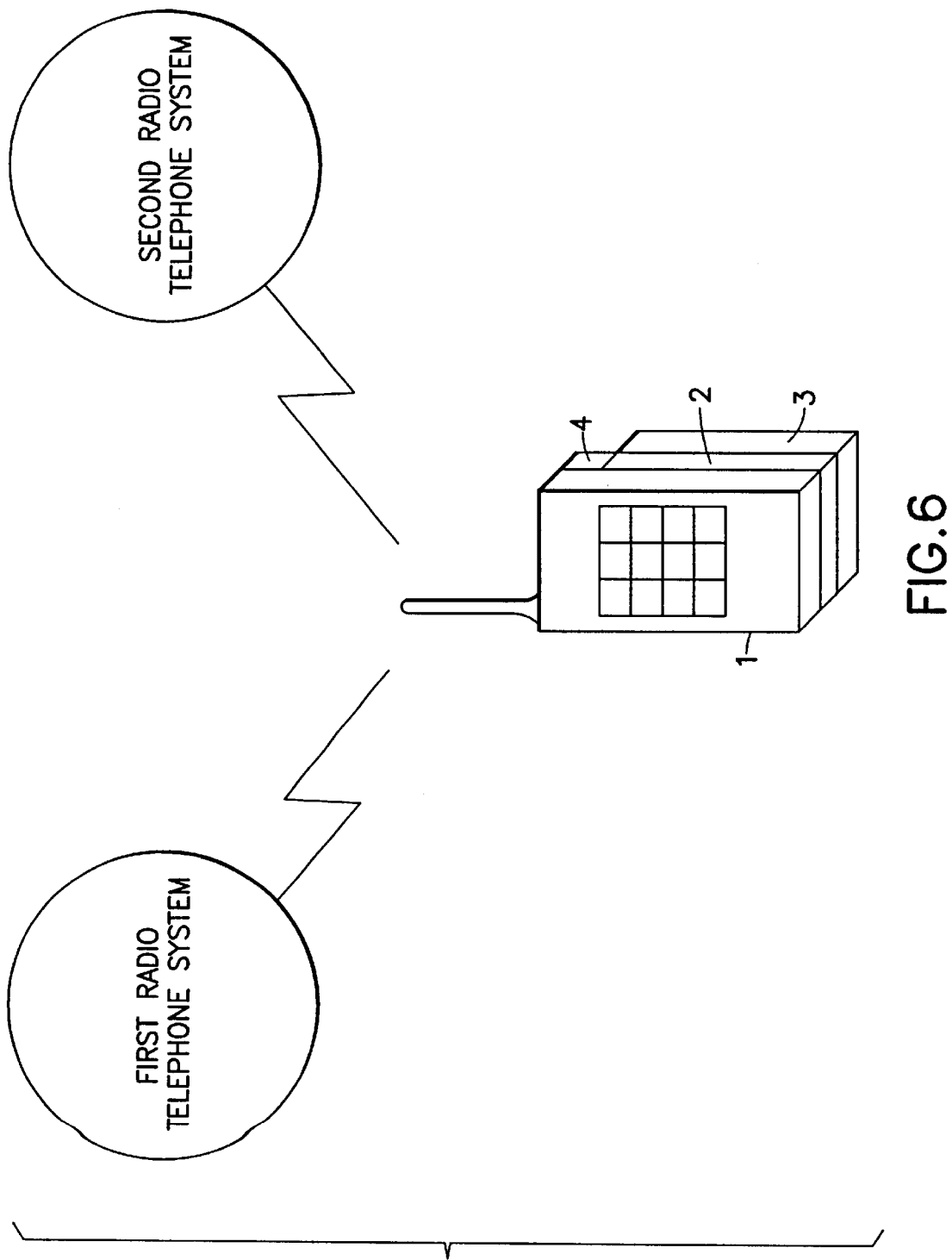
FIG. 6 is a schematic illustration of using the telephone in a first radio telephone system and a second radio telephone system.

FIG. 1 demonstrates according to the invention a structural example of a mobile phone composed of separate modules. The phone includes a basic module 1, a discrete first additional module 2, a discrete second additional module 3, and a battery 4. The basic module 1 includes at least the components and functions which are common to phones operating both in analogue and digital mode, such as a keypad, a display and their control electronics, a microphone, an earpiece, audio amplifiers, an antenna, a duplex filter, a microprocessor, and a potential subscriber identity module (SIM). In other words, the basic module 1 has basic circuitry common to the alternative operation of the telephone in the analogue and digital modes. The first additional module 2 includes the main part of the non-common circuits required in transmitting and receiving an analogue signal, such as the RF and IF components for the analogue receiver, an analogue transmitter, and a modem transmitting and receiving analogue signal data. The second additional module 3 includes the main part of the non-common circuits required in transmitting and receiving a digital signal, such as the RF and IF components for the digital receiver, a digital transmitter, and other digital signal processing components characteristic for digital operation, such as a demodulator, an equalizer, a digital modulator, an encoder and a decoder of the traffic and control channel, a speech encoder, and an echo suppressor. Thus, as illustrated in FIG. 6, the telephone can be used in a first radio telephone system, such as a digital system, or a second radio telephone system, such as an analogue system. Part of the above-mentioned operations and circuits of the additional components may also be included in the basic module if they can be common to the analogue and digital modes. For instance, the synthesizer in the RF components can be included in the basic module. The basic module may also include parts, the mode of operation of which can be shifted to conform to the mode which is being in operation. For instance, the transmitter can be constructed to act in conformance with the requirements of either the analogue or the digital operation. In other words, the list of the operations including different components is not binding and the contents and functions of the different modules have been described more in detail in association with FIG. 4. In addition, the phone includes a battery 4 which can be a separate additional module or it may be included fixedly in the basic module 1, in the first additional module 2, or in the second additional module 3.

Figure 2:
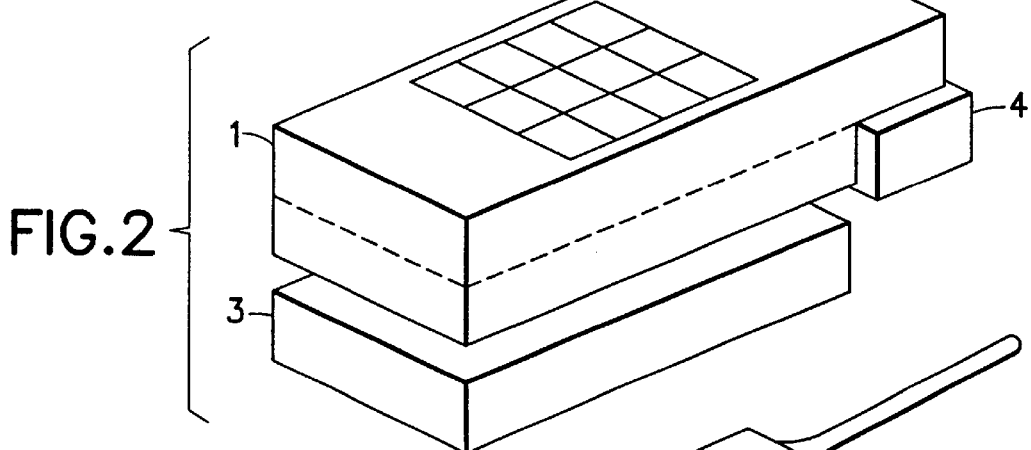

In FIG. 2 the first additional module 2 is fixedly included in the basic module 1, whereby the basic module operates as an analogue phone. The second additional module 3 can be plugged separately to the phone, whereby the phone operates as a dual-mode phone. In addition, the phone includes a battery 4 which can be a separate additional module or be included fixedly in the basic module 1 or in the second additional module 3.

Figure 3:
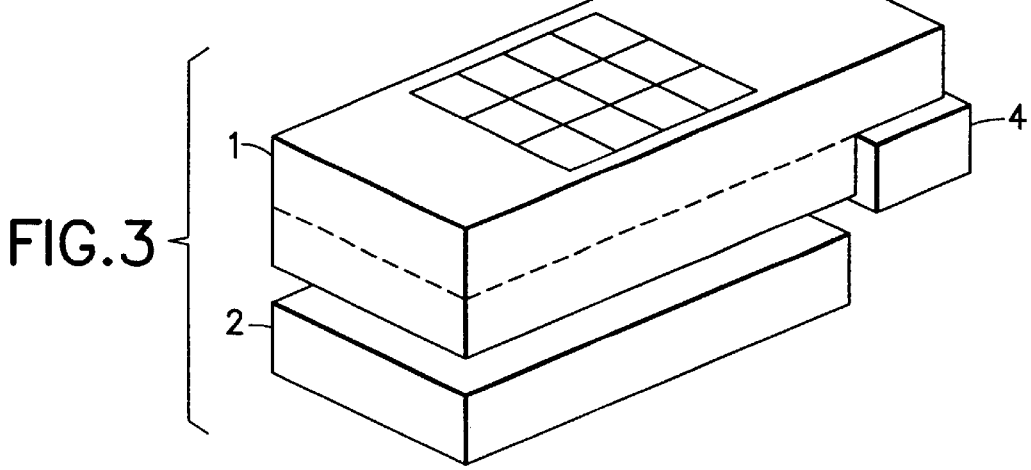

In FIG. 3, the second additional module 3 is fixedly included in the basic module 1, whereby the basic module operates as a digital phone. The first additional module 2 may be attached separately to the phone, whereby the phone operates as the dual-mode phone. In addition, the phone includes a battery 4 which can be a separate additional module or be included fixedly in the basic module 1 or in the first additional module 2.

Figure 4:
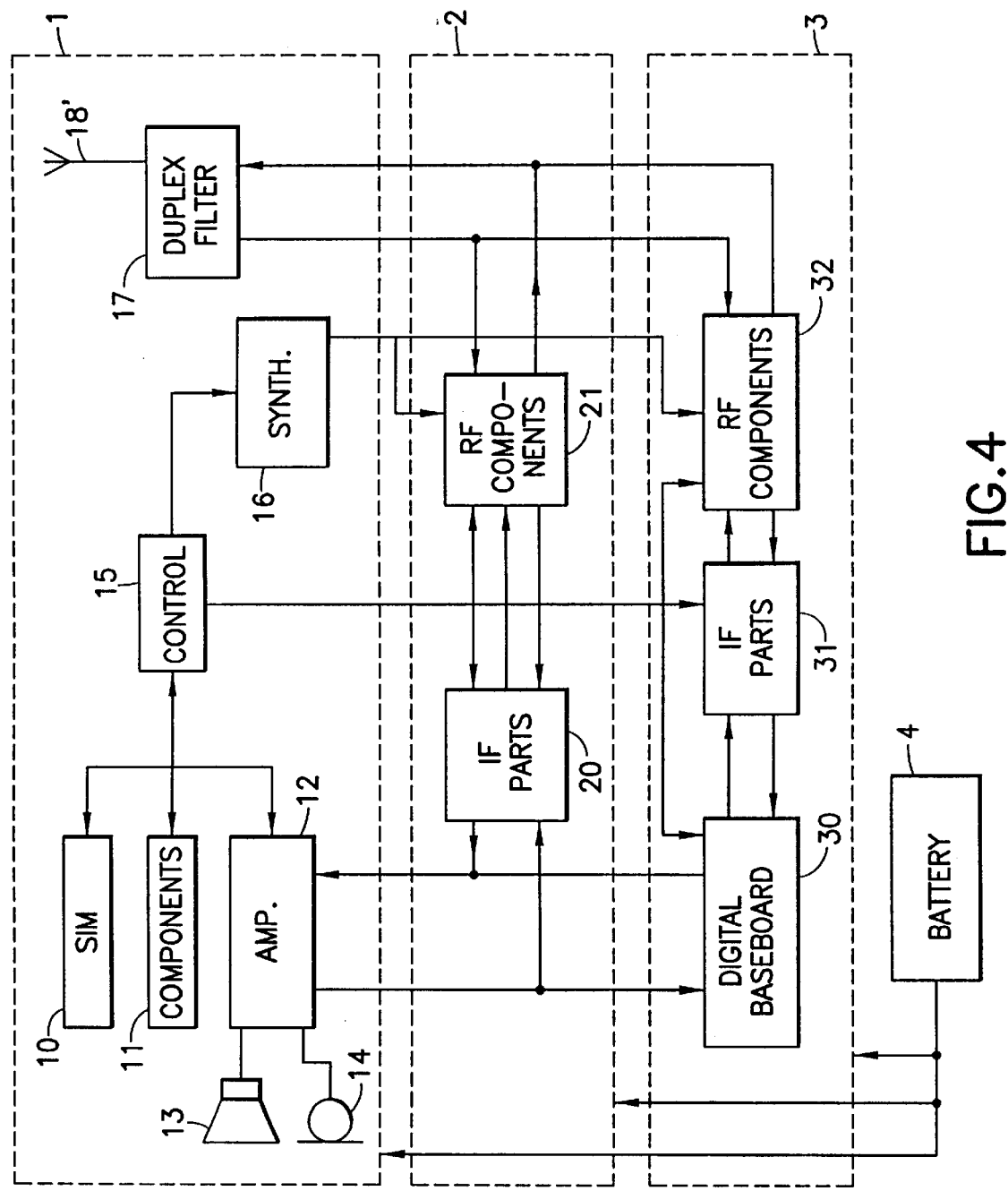
FIG. 4 shows more in detail the contents of the separate modules.

FIG. 4 shows more in detail the contents of the modules 1, 2 and 3. As earlier mentioned the basic module 1 includes components and functions, which are common for analogue as well as digital mode telephones. One of these components and functions is the Subscriber Identity Module (SIM), which is a smart card, which includes the actual telephone number and is optional so that the telephone number is included in the basic module when the usage of a SIM is not wanted. By connecting the SIM card to the mobile telephone (Mobile Equipment) it is activated and can be used as a Mobile Station. Other components and functions included in the basic module are the display, keyboard and their control logic, which all are included here in block 11, and the audio amplifiers 12, the earpiece or speaker 13, and the microphone 14. The central component of the basic module is block 15 including the microprocessor and control logic of the telephone. The control block 15 is in a bidirectional connection to the SIM 10, the interface 11 and the audio amplifiers 12, which controls the speaker 13 and the microphone 14. The microprocessor 15 also controls the synthesizer 16, which generates frequencies needed by the RF-components 21, 32 in the additional modules 2, 3 for transferring the intermediate frequency (IF) signals to transmission frequency and the received signals to an intermediate frequency (IF). The basic module 1 also includes a duplex filter 17, which is connected to the antenna 18 and leads the received signals to the receiver without disturbing the transmitter and leads the transmission signals from the transmitter to the antenna 18 without causing disturbances on the receiver.

The first additional module 2, the analogue module, includes the majority of the components needed for reception and transmission of an analogue signal, i.e. components for processing an analogue signal. Among these components are the IF parts 20 of the analogue receiver, which parts include a modem for transmission and reception of analogue signal data between the audio amplifiers 12 and an RF block 21. The analogue module 2 also includes analogue receiver RF parts and an analogue transmitter, both included in the figure in block 21 and are connected to the IF parts 20 for reception therefrom of an IF signal to be converted to transmission frequency in block 21 as well as for transferring and converting a received signal to an intermediate frequency to the IF parts 20. The RF block 21 receives the mixing frequencies from the synthesizer 16 in the basic module 1 and the RF block 21 is also connected to the duplex filter 17 for transmission and reception therethrough.

The second additional module 3, the digital module, includes the majority of the components needed for reception and transmission of a digital signal, i.e. components for processing a digital signal. Among these components are the IF parts 31 of the digital receiver, which parts include an equalizer and a modem for transmission and reception of digital signal data between a digital baseband block 30 and an RF block 32. The digital module 3 also includes digital receiver RF parts and a digital transmitter, both included in the figure in block 32 and are connected to the IF parts 31 for reception therefrom of an IF signal to be converted to transmission frequency in block 32 as well as for transferring and converting a received signal to an intermediate frequency to the IF parts 31. The RF block 32 receives the mixing frequencies from the synthesizer 16 in the base module 1 and the RF block 32 is also connected to the duplex filter 17 for transmission and reception therethrough. The digital module 3 comprises a digital baseband block 30, which includes digital signal processing components for the functions which are specific for digital operation such as an encoder and a decoder for the speech and control channels, and an echo suppressor, which might as well be included in the audio amplifier block 12 in the basic module 1. All three digital blocks 30, 31, 32 are controlled by the microprocessor 15 in the basic module 1.

A battery 4, which may be separate or part of any of the modules 1, 2, 3, generates the supply voltages for the components of each module. The arrangement explained above can be varied. The RF blocks 21, 32, for example, may be included in the basic module 1. Also both the analogue 2 as well as the digital module 3 may have own microprocessors.

As taught by the invention, a radio phone composed of separate modules can be turned into a single-mode or a dual-mode phone by plugging thereto a separate replaceable first additional module and/or a second additional module. The phone is small in size when only one mode of operation is needed, but it is also utilizable in a dual-mode network or in an analogue and digital network operating in one and the same frequency range in that a separate first additional module or a second additional module is plugged thereto. The telephone gives the user a freedom to select which of the separate modules he wishes to acquire in addition to the basic module, and the user may choose between different combinations according to his/her own needs.

The means of the invention may therefore be used in two modes and the separate analogue and digital modules are less costly than two separate phones.

Also, as mentioned above, the invention is applicable to a telephone operable in two different digital modes, e.g. a time division multiple access (TDMA) system and a code division multiple access system (CDMA).

Figure 5:
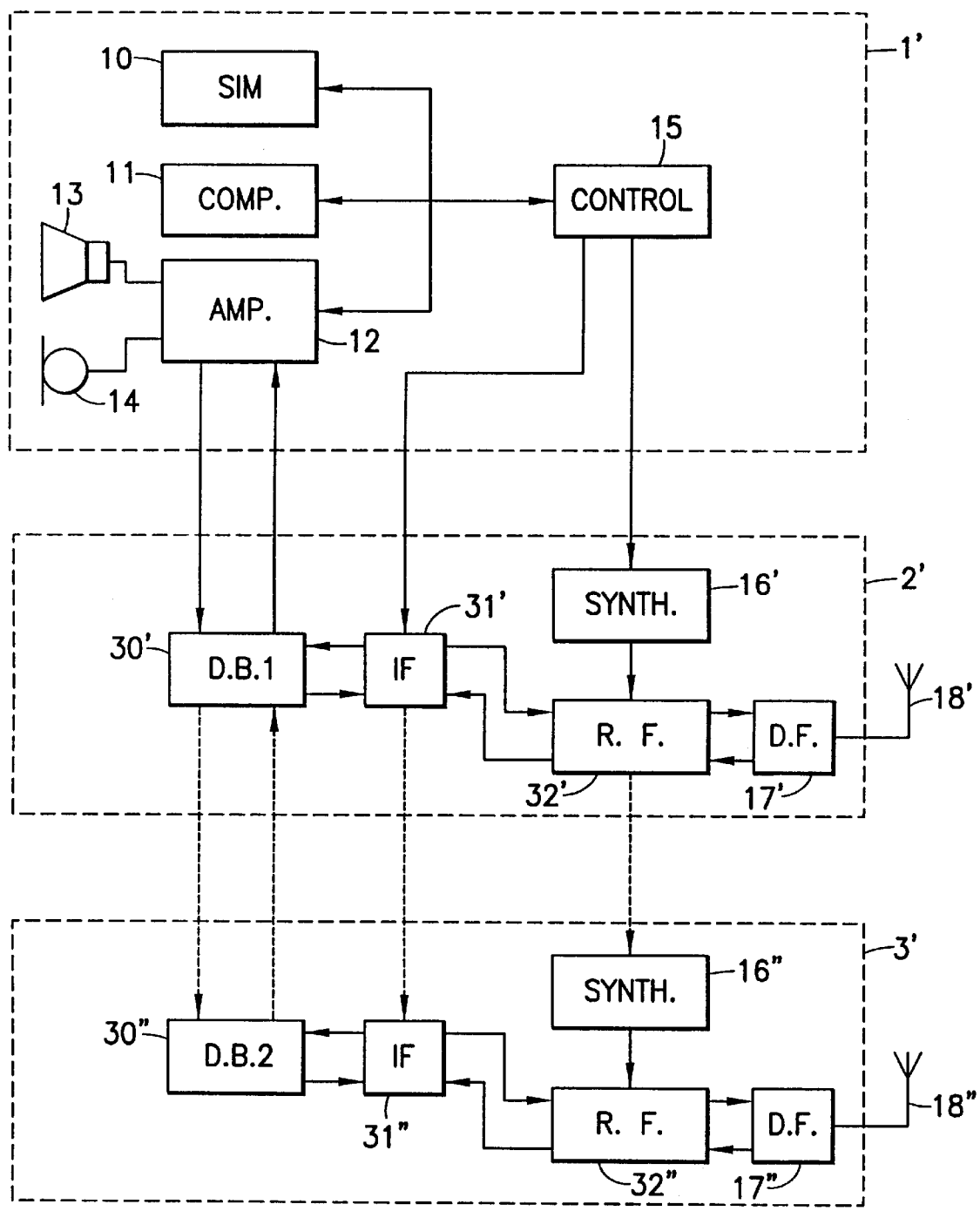
FIG. 5 shows an alternate embodiment of the present invention.

Referring now also to FIG. 5, where similar reference numbers are used to indicate similar components, there is shown the contents of modules 1', 2' and 3' of an alternate embodiment of the present invention. In this embodiment, the additional modules 2' and 3' each have their own separate antenna 18' and 18". Each additional module 2' and 3' are also provided with their own separate synthesizer 16' and 16" and, their own separate duplex filter 17' and 17". Each additional module 2' and 3' also has a separate digital baseboard 30' and 30". Comparing FIG. 5 to FIG. 4, the basic module 1' does not have a synthesizer, duplex filter or antenna. This type of modular configuration can be used where the two modes of operation correspond to two different systems in different frequency bands. It may be advantageous to include all the RF components, antenna, duplexer, transmitter, receiver, synthesizer and IF parts into the supplemental modules. FIG. 5 illustrates that the concept of the present invention can be utilized to build multi-mode signal processing equipment, using modules, where the whole RF and digital processing related to the radio signals is included into one supplemental module.

What is claimed is:

1. A radio telephone for operating in at least two signal processing modes of operation, comprising:
    a basic module (1) including basic circuitry consisting of all circuitry which is common to the operation of the telephone in both of the signal processing modes,
    a discrete first supplementary module (2) including first supplementary circuitry consisting of only non-common circuitry for processing signals characteristic of a first one of the modes of operation, and
    a discrete second supplementary module (3) including second supplementary circuitry consisting of only non-common circuitry for processing signals characteristic of a second one of the modes of operation,
    wherein at least one of the first and second supplementary modules are detachably coupled to the basic module such that the telephone is operable in the first and second modes according to which of the first and second supplementary modules is coupled to the basic module.

2. A radio telephone as claimed in claim 1, wherein the first supplementary circuitry includes circuitry for processing digital signals associated with a first radio telephone system, and the second supplemental circuitry includes circuitry for processing digital signals associated with a second radio telephone system.

3. A radio telephone as claimed in claim 2, wherein the first supplementary circuitry comprises RF and IF components of a digital receiver and a digital transmitter.

4. A radio telephone as claimed in claim 1, wherein the first supplementary circuitry includes circuitry for processing analogue signals associated with an analogue radio telephone system, and the second supplementary circuitry includes circuitry for processing digital signals associated with a digital radio telephone system.

5. A radio telephone as claimed in claim 4, wherein the first supplementary circuitry comprises RF and IF components of an analogue receiver, an analogue transmitter, and a modem for transmitting and receiving analogue signal data.

6. A radio telephone as claimed in claim 1, wherein the basic module comprises a keypad, a display, a microphone, an earpiece, audio amplifiers, an antenna, duplex filtering means, and a microprocessor for controlling the functions of the telephone.

7. A radio telephone as claimed in claim 1 wherein the second supplementary circuitry comprises RF and IF components of a digital receiver, a digital transmitter, a demodulator, an equalizer, a digital modulator, an encoder and a decoder for the traffic and control channels, a speech encoder, and an echo suppressor.

8. A radio telephone as claimed in claim 1 wherein both said first and second supplementary modules respectively are detachably coupled to the basic module.

9. A radio telephone as claimed in claim 1 wherein one of the supplementary modules is detachably coupled to the other supplementary module.

10. A radio telephone comprising:
    a basic module having circuitry common to alternative operation of the telephone in an analogue signal processing mode and a digital signal processing mode;
    a first supplemental module removably coupled to the basic module, the first supplemental module including means for processing digital radio telephone signals; and
    means for detachably connecting an additional second supplemental module to the basic module, the additional second supplemental module including means for processing analogue radio telephone signals, wherein the telephone operates in the digital signal processing mode, and is converted to operate in the analogue signal processing mode when the additional second supplemental module is connected to the basic module.

11. A radio telephone as in claim 10 wherein the first supplemental module is included inside a portion of the basic module.

12. A radio telephone as in claim 10 wherein the telephone further comprises the additional second supplemental module detachably attached directly to the first supplemental module.

13. A radio telephone comprising:

a basic module having all circuitry common to operation of the telephone in two types of active signal processing modes; and a primary supplemental module detachably connected to the basic module, the primary supplemental module being selected from a group consisting of a first supplemental module for processing a first type of radio telephone signals in a first one of the two types of modes and, a second supplemental module for processing a second type of radio telephone signals in a second one of the two types of modes, wherein the radio telephone operates in the two types of modes depending upon which type of primary supplemental module is connected to the basic module.

14. A radio telephone as in claim 13 further comprising a second supplemental module detachably connected to the basic module, the second supplemental module being different from the selected primary supplemental module.

15. A radio telephone as in claim 10 wherein the first supplemental module includes an antenna.

16. A radio telephone as in claim 10 wherein the first supplemental module includes a duplex filter.

17. A radio telephone comprising:

a basic module having basic circuitry common to the alternative operation of the telephone in at least two signal processing modes, the basic module including a speaker, a microphone, an audio amplifier and a control; and a first supplementary module removably connected to the basic module, the first supplementary module including all radio frequency components and components relating to digital signal processing for transmitting and receiving radio communication signals in a first mode of the signal processing modes, wherein the basic module is incapable of transmitting or receiving radio communication signals unless the first supplemental module or a second alternative supplemental module is operably connected thereto.

* * * * *